United States Patent [19]  
Metso

[11] 4,100,662  
[45] Jul. 18, 1978

[54] CONTROLLED DEFLECTION ROLL
[75] Inventor: Pertti Lauri Metso, Karhula, Finland
[73] Assignee: A. Ahlstrom Osakeyhtio, Finland
[21] Appl. No.: 754,520
[22] Filed: Dec. 27, 1976
[30] Foreign Application Priority Data
Jan. 21, 1975 [FI] Finland .................. 750135
[51] Int. Cl.² .................. B21B 13/02
[52] U.S. Cl. .................. 29/110; 29/116 AD
[58] Field of Search .......... 29/110, 113 AD, 116 AD
[56] References Cited
U.S. PATENT DOCUMENTS

| 3,336,648 | 8/1967 | Alexeff | 29/113 AD |
| 3,638,292 | 2/1972 | Gaghan | 29/113 AD |
| 3,750,246 | 8/1973 | Pessen | 29/113 AD X |
| 3,840,958 | 10/1974 | Mahn | 29/113 AD X |

FOREIGN PATENT DOCUMENTS 6,509,484  2/1966  Netherlands ........... 29/113 AD

Primary Examiner—Alfred R. Guest  
Attorney, Agent, or Firm—Bucknam and Archer

[57] ABSTRACT

A controlled deflection roll comprising an inner shaft and an outer roll shell which is attached to the shaft at its middle where the deflection of the roll shell can be eliminated by supporting forces generated by hydraulic pressure applied on balls disposed in radial borings in pressure means located at the ends of the roll shell.

10 Claims, 5 Drawing Figures

B—B

CONTROLLED DEFLECTION ROLL

BACKGROUND OF THE INVENTION

This invention relates to a controlled deflection roll, and more particularly to a roll comprising an inner shaft and an outer shell which is attached to the shaft at its middle or near it and where the deflection of the outer shell caused by the load acting on the roll is partly or entirely eliminated by means of adjustable supporting forces acting upon the ends of the shell.

As an example of a roll of that kind the structure disclosed in the U.S. Pat. No. 3,676,909 can be mentioned. The supporting forces in a roll of this kind can be achieved for instance by excenter means or by using hydraulic load devices. The excenter means are however very complicated. In the hydraulic load devices of the prior art there are several seals between moving and stationary parts where oil leakage and friction losses accure. In either case it is very difficult to adjust the direction of the supporting forces while the roll is in operation.

Controlled deflection rolls are used for instance as press rolls in paper machines and as supporting rolls in slitter rewinders. In particular in the latter application where the rotative velocity of the roll is high and fluactuating, harmful vibrations often occure in the devices according to the prior art. Furthermore it is desirable that the direction of the supporting force should be adjustable while the diameter of the reel of paper increase.

The main object of the present invention is to provide a controlled deflection roll, wherein the direction and the size of the supporting forces acting upon the ends of the roll shell can easily be adjusted and which has no tendency to vibrate.

DESCRIPTION OF THE DRAWINGS

Specific examples of the present invention are illustrated by the accompanying drawings in which.

Figure 1:
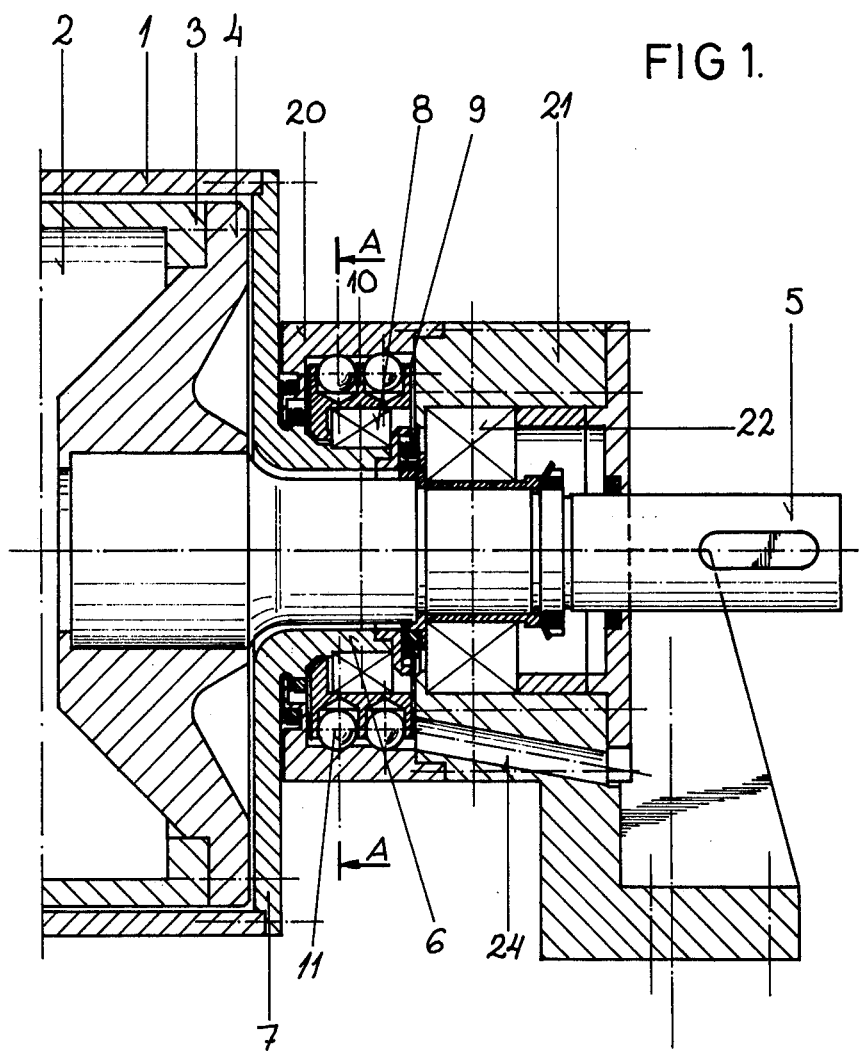
FIG. 1 is an axial sectional view of a roll shell supporting device built in accordance with the invention.

The roll which is partly shown in FIG. 1 comprises an outer shell 1 which is attached to the rotating inner shaft 2 at its middle or near it for instance in a manner disclosed in the U.S. Pat. No. 3,941,435. The inner shaft consists of tubular shaft elements 3, end discs 4 and journal ends 5. To the roll shell are fastened end plates 7 provided with hubs 6 in which the inner ring of a bearing 8 is mounted. The outer ring of bearing 8 is mounted inside the pressure ring 9 of the supporting device. In the pressure ring there is a plurality of radial borings 10, preferably spaces at equal angles from each other. Balls 11 are disposed within the borings.

Figure 2:
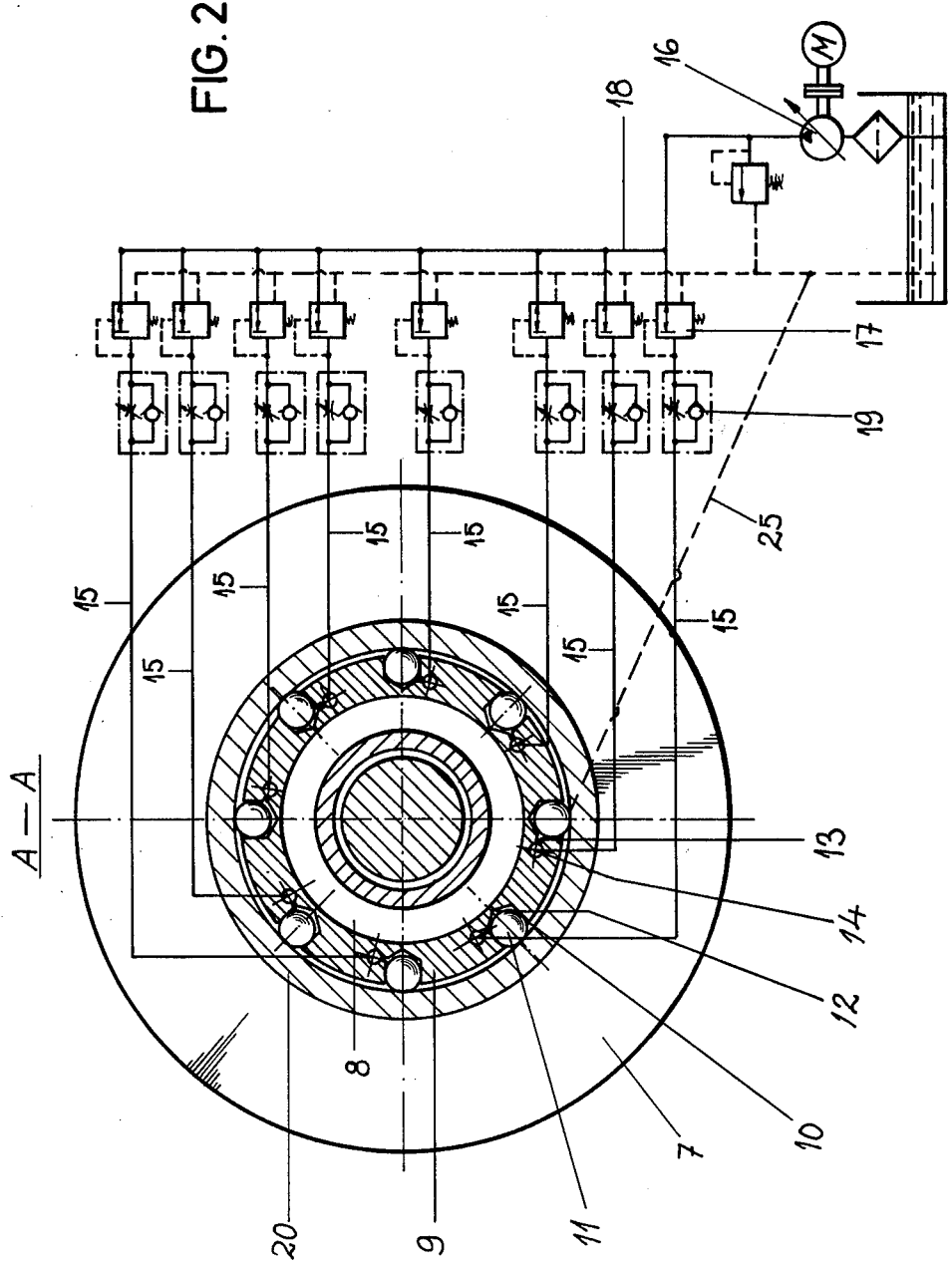
FIG. 2 is a cross section taken on the line A—A of FIG. 1.
Figure 3:
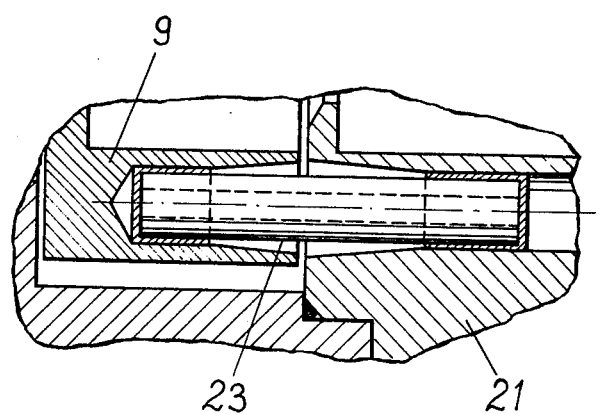
FIG. 3 shows a detail of the device.

As shown in FIG. 2, hydraulic fluid under pressure can be directed to the spade 12 under the balls through the borings 13 and 14 which are connected to a pump 16 through lines 15. The space under each ball is connected through a separate line and a separate pressure reducing valve 17 to the feed line 18. Additionally there are valves 19 which permit the oil to flow freely to the spaces under the balls, but restrict the flow in the opposite direction. The balls are arranged to contact a surrounding support ring 20, which is attached to the bearing 22, rotably supporting the journal end 5. The pressure ring 9 is connected to the bearing pedestal 21 by means of a flexible pin 23 as shown in FIG. 3.

The clearance between the balls 11 and the borings 10 is such that the balls can move easily in the borings but the oil leakage is as small as possible. The leakage oil is removed through the boring 24 and the line 25 shows in FIGS. 1 and 2.

When hydraulic fluid under pressure is directed to the space under the balls, the balls function as pistons and generate radial forces between the support ring 20 and the pressure ring 9. If the balls are of equal size and equally spaced in the pressure ring, the resulting force is zero when the pressure applied on each ball is the same. If the pressure exerted against the balls are adjusted to be unequal, a force is generated which strives to move the pressure ring in relation to the support ring, i.e. a force bending the roll shell is generated. In this manner a bending moment of any desired size and direction can be achieved, by means of which, the deflection of the roll shell caused by a load acting on the roll can be partly or entirely eliminated. The supporting force caused by the hydraulic pressure is transmitted to the roll shell through the bearing 8. The pressure ring is prevented to rotate as shown in FIG. 3.

If the roll shell tends to vibrate, each ball and the hydraulic system behind it functions as a shock absorber, because the oil which flows out from the space under the balls, when each ball is forced into its boring, flows through a restriction in the valves 19. Because the balls are located on all sides of the pressure ring an efficient dampening of the vibrations in all directions is achieved.

Figure 4:
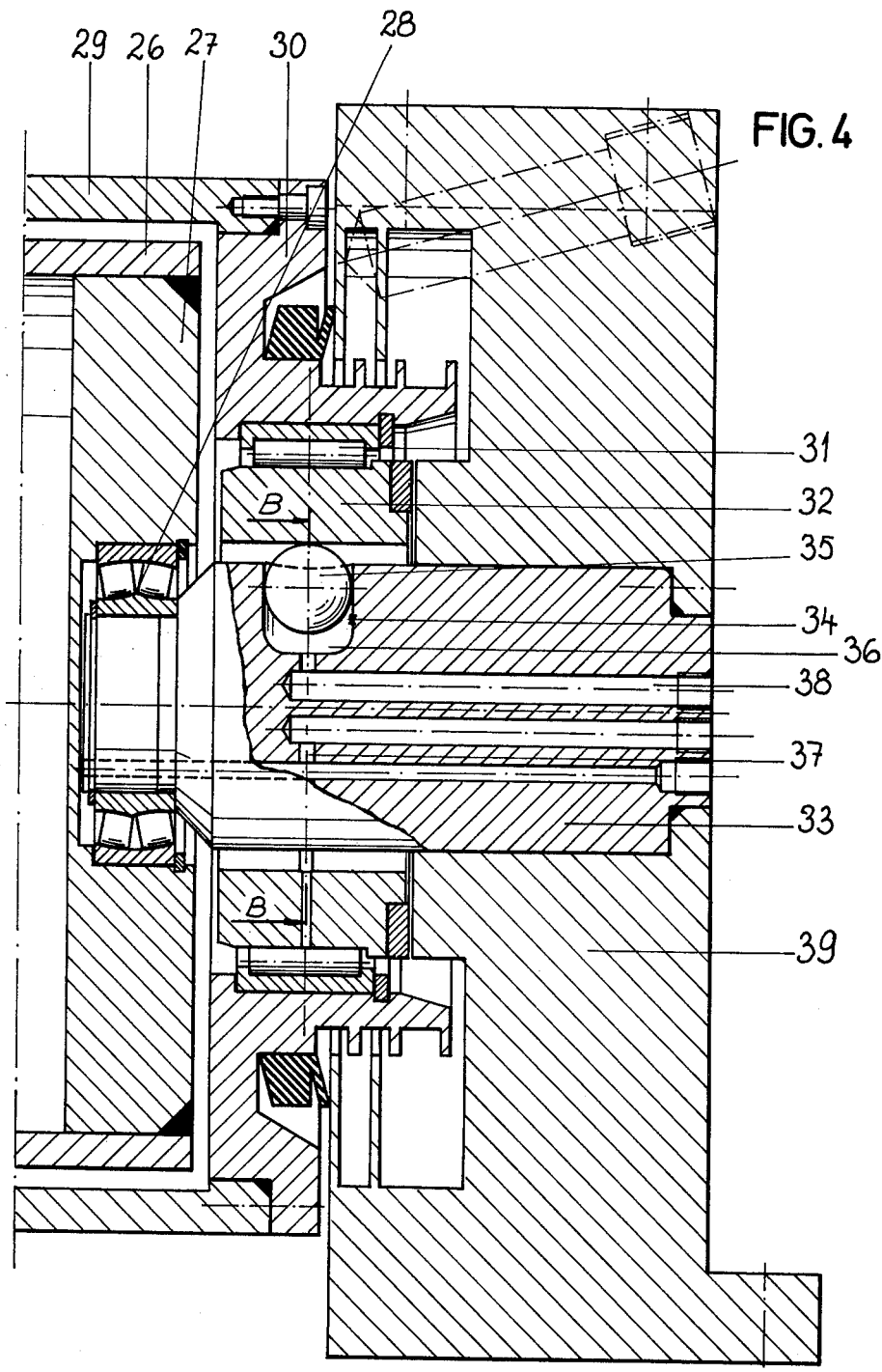
FIG. 4 shows another embodiment of the invention in an axial sectional view.

In the embodiment shown in FIG. 4 the tubular inner shaft 26 is rotably supported in bearings 28 mounted in the end discs 27. The roll shell 29 which is attached to the inner shaft in its middle or near it, is rotably supported in bearings 31 mounted in the end discs 30. The support ring 32, which forms the inner ring of the bearing, surrounds the pressure plug 33 provided with a plurality of radial borings, in which the balls 35 can move. The spaces 36 under the balls are connected to a hydraulic pressure source through the borings 37 and 38. The support ring is held against rotation. The inner shaft is rotably supported by a bearing 28 mounted on the end of pressure plug 33, which is rigidly attached to a support pedestal 39.

The function of the embodiment shown in FIG. 4 can easily be understood from the description of the embodiment in FIG. 1 and 2. It is suited for rolls which do not need to be connected to drive means as for instance paper guide rolls and felt guide rolls in paper machines.

The balls which are used as pistons are balls of the type used for ordinary ball bearings and as such can be easily obtained at a moderate price. Because of the fact that the balls are only in contact with nonrotating surfaces which hardly more at all in relation to them, the wear of the balls is negligible. The supporting force is transmitted to the rotating parts through rolling bearings which are lubricated by leakage oil.

In order to achieve dampening of the vibration and adjustment of the supporting forces in all directions, there must be at least three radial borings, at equal angles to each other in which balls movable by hydraulic pressure are disposed in the pressure means (9, 33).

In order to achieve a dampening effect in all directions a pressure must be maintained under each ball. This also guarantees that the balls will be lubricated. An oil of high viscosity should be used in order to minimize the oil leakage.

From the foregoing description of two preferred embodiments of the invention, the artisan will appreciate that the invention basically is directed to an improvement in a controlled deflection roll apparatus having a stationary base means 21, an inner shaft 2, 26 supported by such base means for rotation relative thereto, an outer roll shell 1, 29 attached to the inner shaft at a central lengthwise portion thereof for support thereby and rotation therewith, and fluid pressure operated jack means operable to exert supporting forces on the roll shell at the ends thereof to control the deflection of the roll shell by load forces acting thereon.

Generally, improvement of the invention can be considered as a bearing 8, 31 and 32, having a stationary part 32, and having a rotary part connected to the roll shell for rotation therewith, and a certain combination of features in the jack means. For the embodiment of invention represented by FIGS. 1 and 2, the jack means can be considered as the combination of the pressure ring 9, radial borings 10, balls 11, under-ball spaces 12, borings 13 and 14 line 15 and support ring 20, and optionally the auxialiary equipment including the pump 16, reducing valves 17, feedline 18, check valves 19, leakage collection boring 24 and drain line 25.

Figure 5:
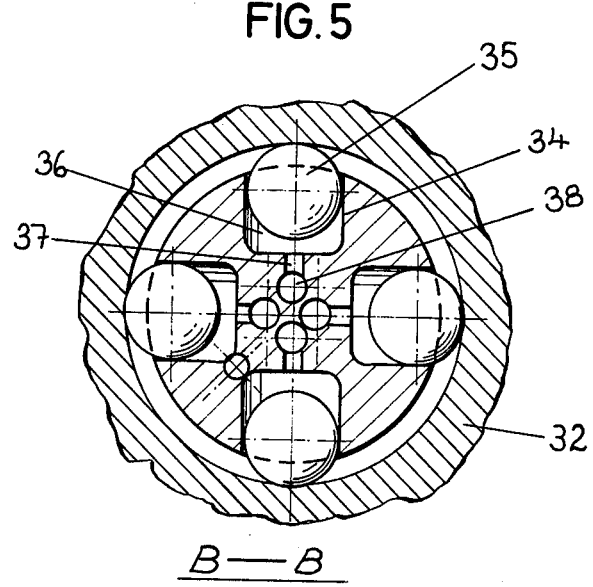
FIG. 5 is a cross section taken on the line B—B of FIG. 4.

For the embodiment of invention represented by FIGS. 4 and 5, the jack means has counterpart elements that may be considered as the combination of support ring 32, pressure plug 33, radial borings 34, balls 35, under-balls spaces 36, borings 37 and 38, and typical fluid pressure supply and regulating equipment, such as is exemplified by FIG. 2 and connected with borings 38.

In both embodiments, the jack means has a plurality of reaction elements expediently in the form of balls 11 or 35 aligned along respective radial paths defined by the axis of respective radial borings 10, 34, and these reaction elements are responsive to the influence of fluid pressure in the under-balls spaces 12, 36, to generate forces directed along such respective radial paths. These forces are applied to the stationary part of the bearing 8, or in the case of the FIGS. 4 and 5 embodiment, to the ring 32, and are transmitted through the rotary part of the bearing to the roll shell to control the deflection thereof by the load forces. The radial paths along which the forces generated by the reaction elements act are generally stationary with respect to the base means 21, which means that there is very little wear on the reaction element balls 11, 35. Also, there is no need to provide for the transmission of pressurized fluid to any rotating parts, since the ring 9 of FIGS. 1 and 2 and the plug 33 of FIGS. 4 and 5, which in both instances receive the reaction elements, are stationary.

For better control of the force applied to the roll shell to counteract the load force deflection thereof the jack means has fluid flow paths 13, 14 and 15 and 37, 38 to the reaction elements accommodating the adjustment of the fluid pressure influencing respective reaction elements 11, 35 for corresponding adjustment of the generated forces.

What is claimed is:

1. In a controlled deflection roll apparatus having a stationary base means, an inner shaft supported by said base means for rotation relative thereto, an outer roll shell attached to the shaft at a central lengthwise portion thereof for support thereby and rotation therewith, and fluid pressure operated jack means operable to exert supporting forces on the roll shell at the ends thereof to control the deflection of the roll shell by load forces acting thereon, the improvement which comprises: a bearing having a stationary part and having a rotary part connected to said roll shell for rotation therewith, and said jack means having a plurality of reaction elements aligned along respective radial paths and responsive to the influence of fluid pressure to generate forces directed along said respective paths and applied to the stationary part of said bearing and transmitted through the rotary part thereof to the roll shell to control the deflection thereof by said load forces, said radial paths being generally statinary with respect to said base means, said jack means having fluid flow paths to said reaction elements accommodating the adjustment of the fluid pressure influencing respective reaction elements for corresponding adjustment of said generated forces.

2. The improvement according to claim 1 wherein said jack means includes a support member having a plurality of passages each extending along a corresponding one of said radial paths and each receiving a corresponding reaction element.

3. The improvement according to claim 2 wherein said support member is a ring generally concentric with the rotation axis of said inner shaft and outer roll shell.

4. The improvement according to claim 2 wherein said support member is a shaft generally coaxial with the rotation axis of said inner shaft and outer roll shell.

5. The improvement according to claim 2 wherein said jack means includes a plurality of separate fluid flow paths each communicating with a corresponding one of said passages of the support member, and fluid pressure regulator means associated with said flow paths and operable to independently adjust the fluid pressure therein and acting on a corresponding reaction element.

6. The improvement according to claim 2 wherein said jack means includes a flexible pin connecting said support member to said base means and preventing rotation of the support member relative to the base means.

7. The improvement according to claim 2 wherein at least one part of said jack means is rigidly connected to said base means to maintain said radial paths generally stationary and in a predetermined orientation with respect to the base means.

8. The improvement according to claim 2 wherein said reaction elements are disposed for direct contact with the stationary part of said bearing.

9. The improvement according to claim 2 wherein said support member is a ring disposed in circumferentially abutting relatin to the stationary part of said bearing.

10. The improvement according to claim 2 wherein said support member has at least three radially extending passages aligned along respective radial paths that are equally spaced-apart angularly relative to one another.

* * * * *